(12) United States Patent
Johnston et al.

(10) Patent No.: US 7,755,668 B1
(45) Date of Patent: Jul. 13, 2010

(54) MOBILE SURVEILLANCE SYSTEM

(76) Inventors: Gregory E. Johnston, 1528 Monteval Pl., San Jose, CA (US) 95120; Arie Levinkron, 7320 Cirrus Way, West Hills, CA (US) 91307

( * ) Notice: Subject to any disclaimer, the term of this patent is extended or adjusted under 35 U.S.C. 154(b) by 1452 days.

(21) Appl. No.: 09/059,077

(22) Filed: Apr. 9, 1998

(51) Int. Cl.
*H04N 5/232* (2006.01)
*H04N 7/18* (2006.01)

(52) U.S. Cl. .................. 348/211.4; 348/211.8; 348/148

(58) Field of Classification Search .................. 348/148, 348/143, 244, 151, 115, 146, 149, 14.02, 348/14.05, 211.1, 211.2, 211.4, 211.7, 211.49, 348/211.13, 211.8
See application file for complete search history.

(56) References Cited

U.S. PATENT DOCUMENTS

| | | | | |
|---|---|---|---|---|
| 3,605,443 A | * | 9/1971 | Redelman | 464/46 |
| 4,225,881 A | * | 9/1980 | Tovi | 348/151 |
| 4,310,136 A | | 1/1982 | Mooney | |
| 4,386,848 A | * | 6/1983 | Clendenin et al. | 356/5.01 |
| 4,408,695 A | * | 10/1983 | Balkwill et al. | 220/3.3 |
| D273,012 S | | 3/1984 | Kozioski | |
| 4,474,439 A | | 10/1984 | Brown | |
| 4,578,665 A | * | 3/1986 | Yang | 348/143 |
| 4,618,886 A | | 10/1986 | Mooney | |
| 4,687,170 A | | 8/1987 | Beaver | |
| 4,695,881 A | * | 9/1987 | Kennedy et al. | 348/164 |
| 4,709,897 A | | 12/1987 | Mooney | |
| 4,736,218 A | | 4/1988 | Kutman | |
| 4,739,409 A | * | 4/1988 | Baumeister | 348/244 |
| D295,628 S | | 5/1988 | Mooney | |
| 4,910,591 A | | 3/1990 | Petrossian et al. | |
| 4,937,675 A | | 6/1990 | Starceski et al. | |
| 5,008,605 A | * | 4/1991 | Ohara et al. | 318/630 |
| 5,012,335 A | | 4/1991 | Cobodar | |
| 5,017,954 A | * | 5/1991 | Harvey | 396/493 |
| 5,079,634 A | | 1/1992 | Hosoro | |
| 5,093,677 A | * | 3/1992 | McMahon | 396/13 |
| 5,107,286 A | * | 4/1992 | Sergeant et al. | 348/81 |
| 5,111,289 A | * | 5/1992 | Lucas et al. | 348/148 |
| 5,212,655 A | * | 5/1993 | Boehle | 702/155 |
| 5,224,675 A | | 7/1993 | Ellenberger et al. | |

(Continued)

FOREIGN PATENT DOCUMENTS

JP       08-116476       *   5/1996

(Continued)

OTHER PUBLICATIONS

Camera in a police car product, Skaggs Telecommunications Service, Inc., Murray, UT 800.486.1345, product brochure attached Fixed field of view, interior mounted camera and audio system for police car Camera in police car.

*Primary Examiner*—Luong T Nguyen
(74) *Attorney, Agent, or Firm*—Robert E. Malm

(57) ABSTRACT

The invention is a mobile pan and tilt camera and display-control apparatus comprising (1) a fully rotatable camera mounted to a vehicle for capturing images, (2) a display-control box having an image display screen and control buttons for controlling the camera and its movement, and (3) an image capture box for storing the captured images or transmitting the captured images to a remote location. The display-control box is attached to an adjustable mount in the vehicle within an operator's view and reach.

9 Claims, 18 Drawing Sheets

U.S. PATENT DOCUMENTS

| | | | |
|---|---|---|---|
| 5,225,863 A | 7/1993 | Weir-Jones | |
| D340,940 S | 11/1993 | Ellenberger et al. | |
| 5,365,687 A * | 11/1994 | Sclater | 40/610 |
| 5,408,330 A | 4/1995 | Squicciarini et al. | |
| 5,448,290 A | 9/1995 | VanZeeland | |
| 5,472,171 A * | 12/1995 | Nishi et al. | 464/46 |
| 5,526,041 A | 6/1996 | Glatt | |
| 5,528,328 A * | 6/1996 | O'Farrill et al. | 396/544 |
| 5,551,917 A * | 9/1996 | Wood | 464/46 |
| 5,598,207 A * | 1/1997 | Kormos et al. | 348/148 |
| 5,652,849 A * | 7/1997 | Conway et al. | 348/115 |
| 5,671,932 A | 9/1997 | Chapman | |
| 5,729,016 A * | 3/1998 | Klapper et al. | 348/148 |
| 5,737,657 A * | 4/1998 | Paddock et al. | 396/428 |
| 5,751,344 A * | 5/1998 | Schnee | 348/113 |
| 5,762,556 A * | 6/1998 | Kurian | 464/46 |
| 5,816,128 A * | 10/1998 | Bigley et al. | 83/452 |
| 5,873,557 A * | 2/1999 | Schilling et al. | 248/349.1 |

FOREIGN PATENT DOCUMENTS

| | | | |
|---|---|---|---|
| JP | 08-160874 | * | 6/1996 |
| JP | 10-304339 | * | 11/1998 |

* cited by examiner

MOBILE SURVEILLANCE SYSTEM

BACKGROUND OF THE INVENTION

This invention relates generally to the field of surveillance camera systems, and more particularly to an apparatus and process for capturing images by mobile security guards.

Pan and tilt mechanisms for pointing cameras are old as dirt. From the introduction of the wheel, applying a pan and tilt camera system to moving vehicles has been limited. The operation of moving vehicles has evolved and now the opportunity for the addition of augmented vision can be utilized by the vehicle operator for various applications like mobile patrol guard image acquisition or improved driver safety. This technology started in August of 1977 with the incorporation of a cathod-ray tube and video camera on a tripod between the seats of an automobile. Tests were conducted and video tapes were produced through 1980. The project was rekindled in 1996 by using a traditional closed circuit tv (CCTV) hardmounted to a roof-rack and facing forward with a 10" TV monitor inside the cab for camera display. From this configuration and testing, the present invention was developed.

The following patents show prior attempts at various camera and control systems but none show the inventive combination described in our invention.

U.S. Pat. No. 5,671,932 'Camera Crane'—Crane mounted camera for motion picture and television industry. Not applicable to mobile environment nor for patrol guard image capture.

U.S. Pat. No. 5,526,041 'Rail-Based CCTV Surveillance System with Automatic Target Acquisition'—Similar to track-lighting systems with controlled and pre-set actions with target tracking. Not applicable to mobile environment nor for patrol guard image capture.

U.S. Pat. No. 5,448,290 'Video Security System with Motion Sensor Override, Wireless Interconnection, and Mobile Cameras'—Remote control of several cameras from monitor that is normal television. Not applicable to mobile environment nor patrol guard image capture.

U.S. Pat. No. 5,408,330 'Video Incident Capture System'—Camera and recorder mounted inside police car with wireless microphone. Indexing recording tape such that video will not be over-written and includes tamper proofing scheme. Not applicable to vehicle exterior camera mounting and said recording means is tape where this invention digitizes each camera frame and stores in computer based media or transmits said digital image to a web-based data server.

U.S. Pat. No. 5,225,863 'Remotely Operated CameraSystem with Battery Recharging System'—Remotely operated camera mounted on suspension cable. Cable drive system charges camera battery from generator attached to wheels. Not applicable to mobile vehicle environment nor for patrol guard image capture.

U.S. Pat. No. 5,224,675A 'Mounting Apparatus'—Invention is for large rectangular camera systems at stationary sites. Pan and Tilt mechanism is worm gear construction. Flexible adjustment of worm gear mechanical settings. Not applicable to mobile vehicle environment nor for patrol guard image capture.

U.S. Pat. No. 5,079,634 'Apparatus for Wireless-Controlling a Camera and Apparatus for Two-Direction Simultaneous Control of Electrically-Driven Equipment'—Apparatus for wireless-controlling of a camera and two-directional control protocol. Not applicable to mobile vehicle environment nor for patrol guard image capture.

U.S. Pat. No. 5,012,335 'Observation and Recording System for a Police Vehicle'—Video Cam-corder mounted to dash board of Police car. Automatic positioning of FOV from cooperative transmitter/receiver and includes audio from inside car or on the body of officer outside the car. Power supply variation from self contained battery to an electrical supply from car. 'Handy cam-corder' mounted inside vehicle does not enable best field of regard (FOR) nor is it ruggedized for external vehicle mounting above the roof and outboard the vehicle's side.

U.S. Pat. No. 4,937,675 'Remote Viewing Apparatus'—Remotely operable optical viewing apparatus with pan and tilt mechanisms with extreme position slip clutch. Not applicable to mobile vehicle environment nor for patrol guard image capture. Our invention includes a novel slip clutch.

U.S. Pat. No. 4,910,591 'Side and rear viewing apparatus for motor vehicles'—Camera behind exterior mirrors with CRT(s) mounted in interior. Not applicable to mobile vehicle environment nor for patrol guard image capture.

U.S. Pat. No. 4,736,218 'Camera Support and Housing'—Combination of surveillance camera, pan and tilt mechanism, and spherical housing. Not applicable to mobile vehicle environment nor for patrol guard image capture.

U.S. Pat. No. 4,709,897 'Surveillance Camera Mount'—Unique and stationary camera mount. No pan and tilt mechanism and not applicable to mobile vehicle environment nor for patrol guard image capture.

U.S. Pat. No. 4,687,170 'Camera Mounting Bracket'—A housing and mechanism for lifting the cover for camera maintenance. No pan and tilt mechanism and not applicable to mobile vehicle environment nor for patrol guard image capture.

U.S. Pat. No. 4,618,886 'Surveillance Camera Mount'—Unique pan and tilt stationary camera mount. No pan and tilt mechanism and not applicable to mobile vehicle environment nor for patrol guard image capture.

U.S. Pat. No. 4,474,439 'Camera Support'—Multiple camera and support equipment mounting apparatus for motion picture and television film production trucks. No pan and tilt mechanism and not applicable to mobile vehicle environment nor for patrol guard image capture.

U.S. Pat. No. 4,310,136 'Backlash-Free Swivel and Tilt Mounting'—Complex mechanical pan and tilt backlash mechanism. Our invention is free of costly and additional mechanical components to overcome discernable image distortion from gear backlash or vibration. The field of view is electronically spatially corrected from accelerometer information that is applied in a control feedback loop.

U.S. Pat. No. D340,940S 'Combined Camera Mount and Camera Housing'—Unique design and not applicable to mobile vehicle environment nor for patrol guard image capture.

U.S. Pat. No. D295,628 'Electronic Control for Video Monitoring System'—Unique enclosure design and not applicable to mobile vehicle environment nor for patrol guard image capture.

U.S. Pat. No. D273,012 'Surveillance Camera Housing'—Unique design and not applicable to mobile vehicle environment nor for patrol guard image capture. A camera with a fixed field of view and focal length lens is mounted inside a police vehicle at the front windshield rear-view mirror looking forward. The camera signal is stored on VHS tape in real time (NTSC standard format). Brochure attached.

SUMMARY OF THE INVENTION

The primary object of the invention is a Mobile Pan and Tilt Camera and a Display-Control apparatus for patrol security, safe vehicle operations, and hazard avoidance.

Another object of the invention is rugged design and construction for durable, reliable operation, and long life in rough environments.

Another object of the invention is a simple pan and tilt mechanism with fewer parts and lower costs to manufacturer.

A further object of the invention is a slip-clutch mechanism that is rugged and has few parts that enable low cost.

A further object of the invention is said mobile pan and tilt camera mounts at any angle and is not sensitive to gravity.

Yet another object of the invention is Electronic Image Stabilization overcomes pan and tilt gear backlash pointing error during vibration and saves cost of additional mechanical components to do same function.

Still yet another object of the invention is said mobile pan and tilt camera mounts to typical automotive roof rack systems.

Another object of the invention is said mobile pan and tilt camera system mounts to typical automotive emergency lightbar systems.

Another object of the invention is said mobile pan and tilt camera system has mechanical and electrical 'quick and easy' disconnect mechanism for security and ease of installation.

A further object of the invention is said mobile pan and tilt camera mounts to various brackets for stationary applications.

Yet another object of the invention is said mobile pan and tilt camera incorporates near moisture free system for all weather conditions to avoid fogging of the optics and condensation forming on the camera electronics.

Still yet another object of the invention is Camera power supply heat sink stabilizes enclosure temperature and is made from laminated dissimilar metals and bends towards the metal enclosure as the camera cavity heats up and the bimetal primary heat sink touches the enclosure for significant additional heat sinking when the temperature is exceeding the operational set point.

Another object of the invention is said mobile display-control for patrol security, safe vehicle operations, and threat avoidance.

Another object of the invention is said mobile display-control has six degree of freedom mounting system for best individual viewing angle adjustment and can be operated with a single hand for easy and safe operation in a moving vehicle.

A further object of the invention is said mobile display-control incorporates control of pan and tilt, zoom, focus, autofocus, stabilization, and display brightness and can be operated with a single hand for easy and safe operation in a moving vehicle.

Yet another object of the invention is an Image Capture Box for storage of mobile images on various recording media and archives mobile patrol guard route and services.

Still yet another object of the invention is said image capture box's capacity for temporary mobile image storage and for radio frequency transmission of said mobile images to a data storage server for a consumer to access.

Other objects and advantages of the present invention will become apparent from the following descriptions, taken in connection with the accompanying drawings, wherein, by way of illustration and example, an embodiment of the present invention is disclosed.

A mobile pan and tilt camera and display-control apparatus comprising a fully rotatable camera mounted to a vehicle for capturing images, a display-control box having an image display screen and control buttons for controlling said camera and its movement attached to an adjustable mount in said vehicle within an operator's view and reach, an image capture box for storage on various recording media or for transmission of said captured mobile images, said captured mobile images are sent by radio frequency transmission to a data storage server for a consumer to access.

A process for viewing a scene with a mobile pan or tilt camera comprising the steps of: mounting a camera to a vehicle for capturing mobile images, displaying said images on an image display screen, controlling said camera position from within said vehicle, capturing said images in an image capture box for storage and transmission of said captured mobile images, transmitting said captured mobile images by radio frequency transmission to a data storage server for further processing, and providing said captured mobile images on internet server for official or consumer access.

The drawings constitute a part of this specification and include exemplary embodiments to the invention, which may be embodied in various forms. It is to be understood that in some instances various aspects of the invention may be shown exaggerated or enlarged to facilitate an understanding of the invention.

DETAILED DESCRIPTION OF THE PREFERRED EMBODIMENTS

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Figure 1:
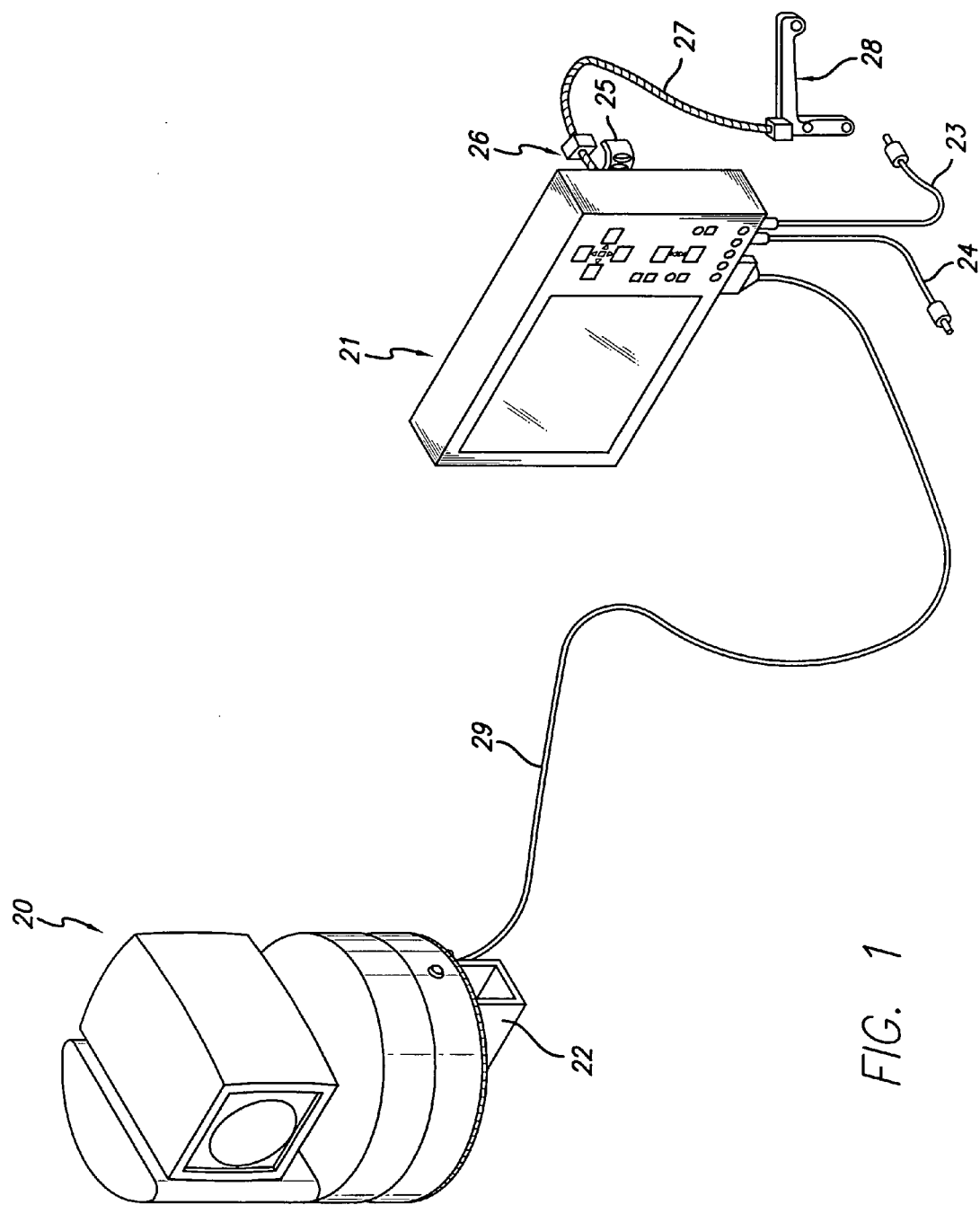
FIG. 1 is a pictorial view of some of the elements of the invention.

FIG. 1 shows a mobile pan and tilt camera (20) that is attached to an electro-mechanical mount (mounting assembly) (22) and is interconnected electrically by a cable (29) to a display-control apparatus (21). Said display-control (21) is attached to an adjustable yoke (26) such that with a single hand, one can adjust the viewing angle of said display-control (21) by moving a yoke lever (25) from a lock position to an unlock position and back to said lock position. Said adjustable yoke (26) is attached to a goose neck (27) where the base of the gooseneck is supported by a bracket (28) that is bolted to a vehicle. Single hand movement of said display-control (21) of said adjustable yoke (26) and said gooseneck (27) enable vehicle operator to position said display to the best viewing angle. Imagery from said mobile pan and tilt camera (20) is displayed on said display and control (21) and can also to routed to additional equipment by an auxiliary video cable (24) connected to said display-control (21) at a spare connector (118). Both said mobile pan and tilt camera (20) and said display-control (21) are supplied electrical power from the vehicle by a power cable (23).

Said mobile pan and tilt camera (20) is mounted to the top of a vehicle achieving the the best open field of regard and viewing angles where electronic imagery can be captured, magnified and presented to the operator for improved vision. Mobile patrol guards can apply said mobile pan and tilt camera (20) and display-control (21) to improve their visual capabilities when performing their duties.

Figure 2:
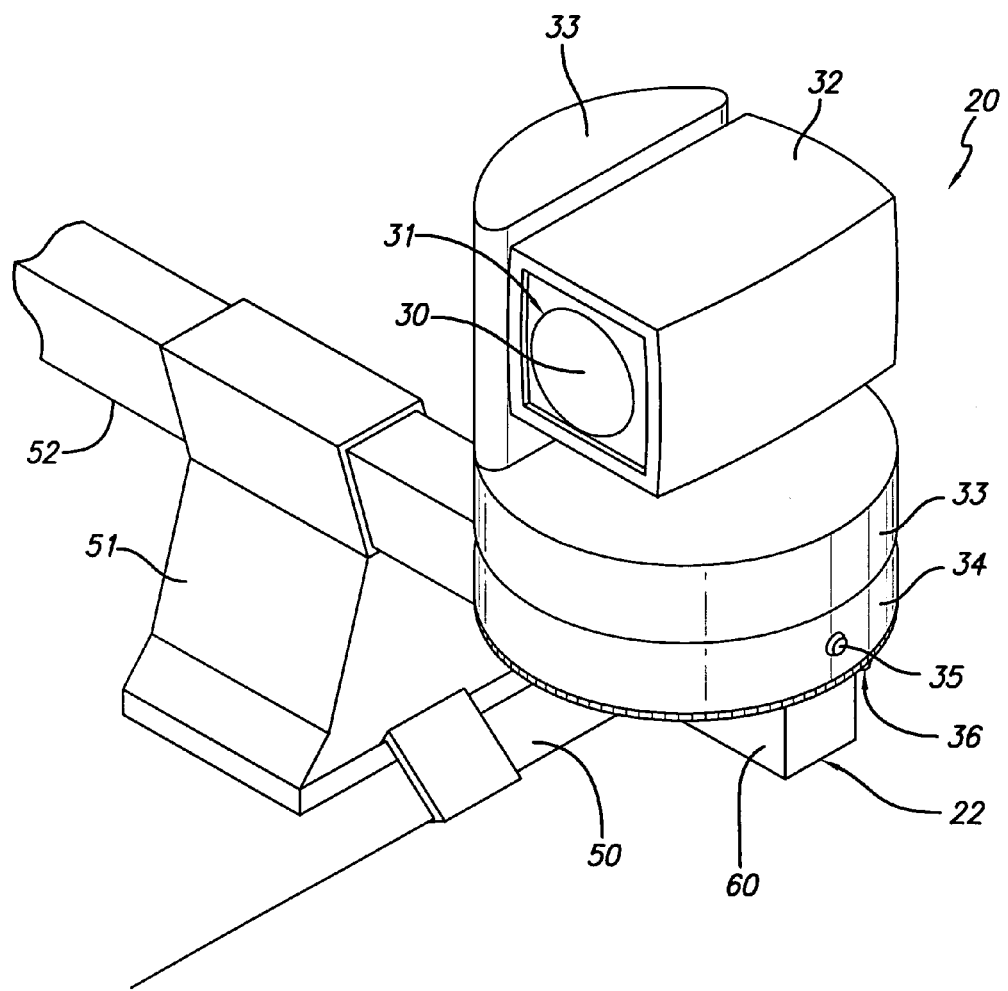
FIG. 2 is a perspective view of a mobile pan and tilt camera mounted to a THULE® brand roof rack.
Figure 3A:
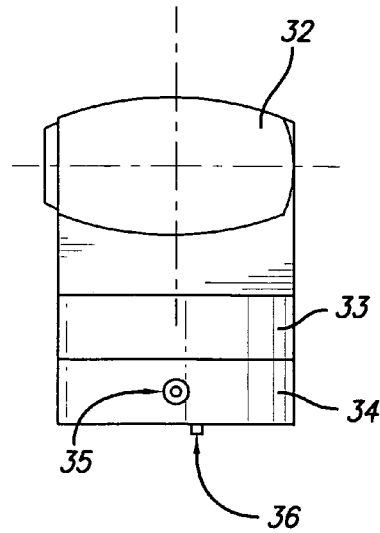
FIG. 3 is a two dimensional, multiple view of said mobile pan and tilt camera showing pan and tilt flexibility, form factor, and mechanical and electrical quick disconnect system.
Figure 3B:
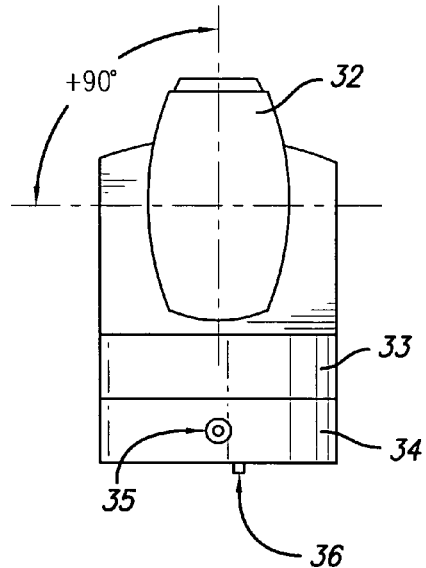
Figure 3C:
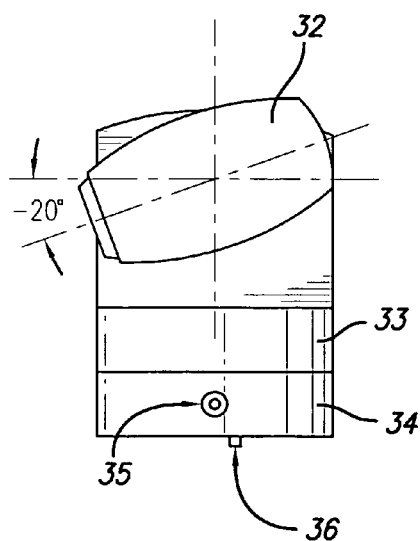
Figure 3D:
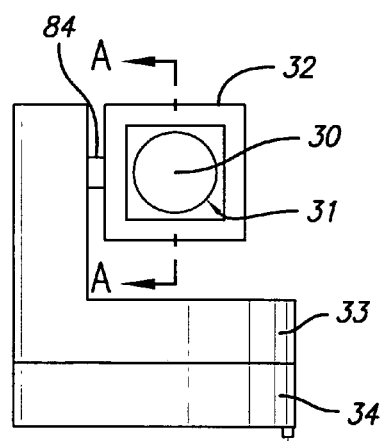
Figure 3E:
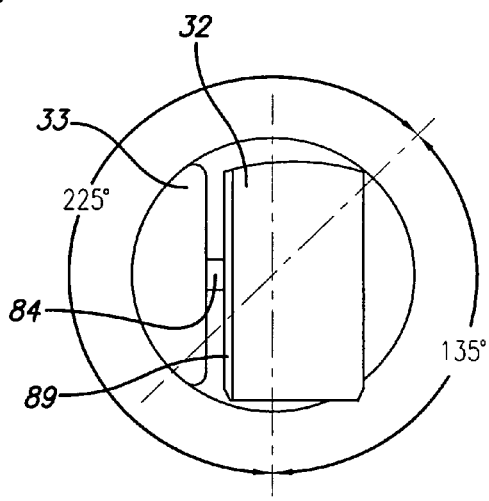
Figure 3F:
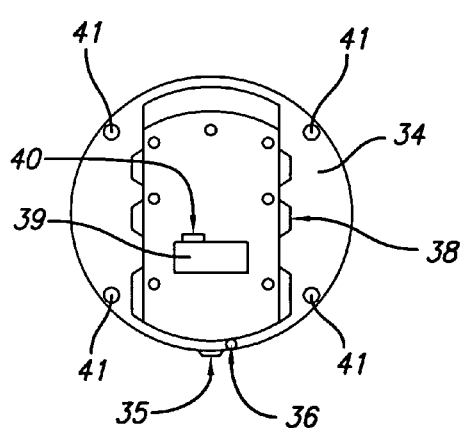

FIG. 2 shows said mobile pan and tilt camera (20) comprised of a camera housing (32) attached from one side to a pan housing (33) that is coupled to a camera base (34). Said camera base (34) can be easily placed or removed from said mounting assembly (22). Said mounting assembly (22) incorporates a roof-rack specific mounting bracket (60) that securely attaches to a roof-rack support bar (52). Said roof-rack bar is supported by a roof-rack mount (51) that is fastened to a vehicle roof (50). Said camera housing (32) incorporates a threaded portal (31) that accepts a commercially available filter or protective optic element (30). From use of said mobile pan and tilt camera (20) in hostile environments, the said protective optic element (30) can be easily replaced by material available in common photography shops. Said mobile pan and tilt camera (20) locks to said mounting assembly (22) automatically from a ball-pin plunger assembly (36) engaging a reference hole (69) (see FIG. 6) in said mounting assembly (22). A second locking and security fastener (35) is hand activated by turning said fastener (35) clockwise to secure and counterclockwise to release.

In FIG. 3 there are six views that show said mobile pan and tilt camera (20) and its pan angle, tilt angle, and mounting features. FIG. 3a is a side view of said mobile pan and tilt camera (20) at zero pitch angle reference. FIG. 3b is a side view of said mobile pan and tilt camera (20) at +90 degree pitch angle. FIG. 3c is a side view of said mobile pan and tilt camera (20) at -20 degree pitch angle. FIG. 3d is a front view of said mobile pan and tilt camera (20) at zero pitch angle reference and shows said commercially available optic element (30). FIG. 3e is a top view of said mobile pan and tilt camera (20) at zero pan angle reference. Also in FIG. 3e it can be seen that said camera housing (32) and said pan housing (33) can move clockwise 225 degrees and counterclockwise 135 degrees and from this rotational flexibility, enable said mobile pan and tilt camera (20) to view complete horizon or 360 degrees. FIG. 3f is a bottom view of said mobile pan and tilt camera (20) that shows said ball-pin plunger assembly (36) location relative to said security fastener (35). Also in FIG. 3f is a slotted opening (38) on both sides of an electrical connector housing (39) that supports an electrical male signal connector (40) that provides the basis of engaging said mobile pan and tilt camera (20) to said mounting assembly (22) for safe and secure mechanical and electrical mating.

Figure 4:
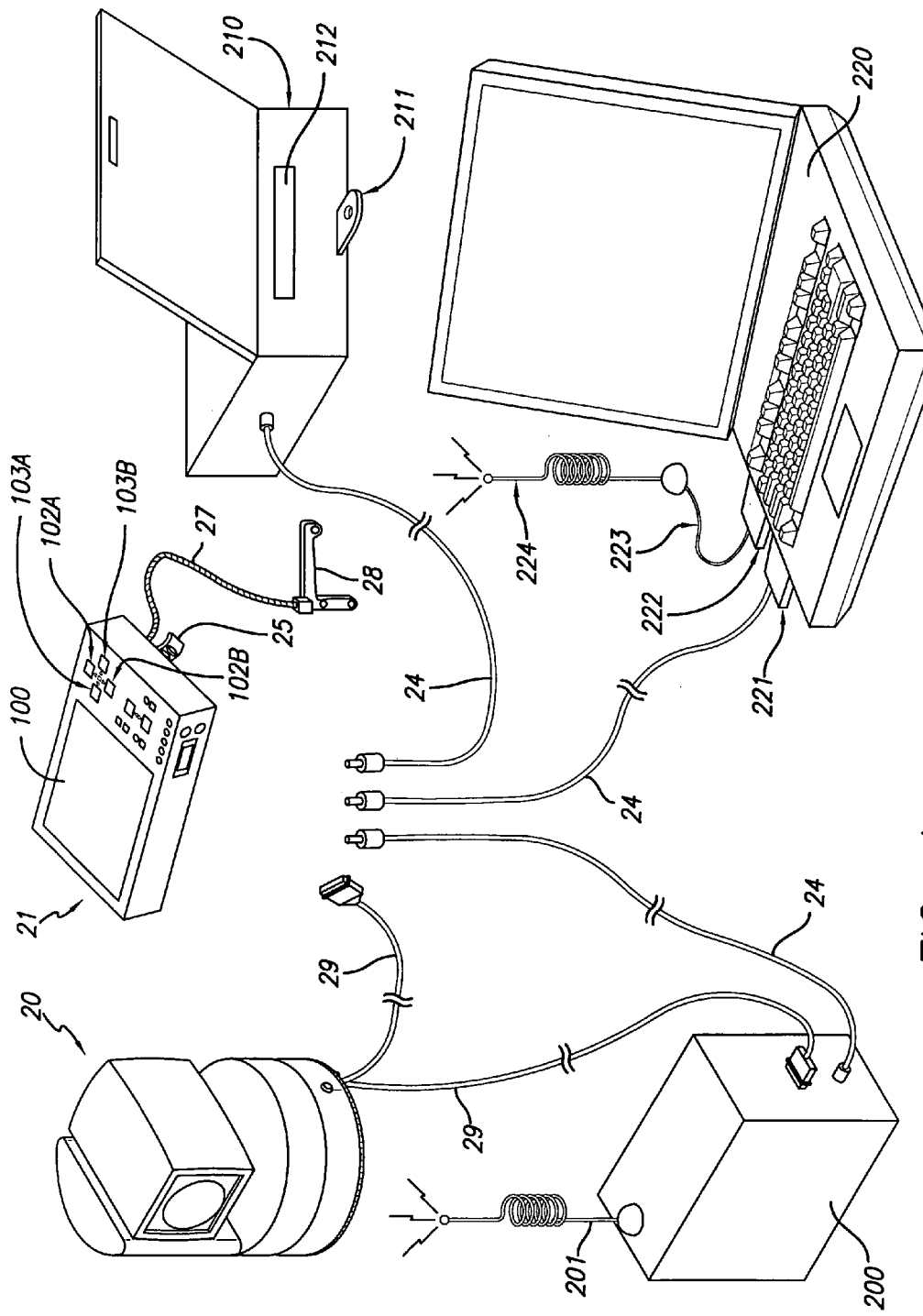
FIG. 4 is a pictorial view of an expanded set of elements of the invention.

FIG. 4 shows various operational configurations of the invention. The said mobile pan and tilt camera (20) can be electrically connected to either said display-control (21) by a signal cable (29) or to an image capture box (200) by said signal cable (29). Image display to the vehicle operator can be achieved with either above described configurations from said display-control (21). In the first case, the said mobile pan and tilt camera (20) is connected by said signal cable (29) to said display-control where images from said mobile pan and tilt camera (20) are shown on a flat panel monitor (100). In the second case said mobile pan and tilt camera (20) is connected by said signal cable (29) to said image capture box (200) and a video signal cable (24) is connected to said display-control (21) where images from said mobile pan and tilt camera (20) are shown on a flat panel monitor (100). Pointing direction of said mobile pan and tilt camera (20) is accomplished from vehicle operator activation of a set of pan control buttons (102a & 102b) and a set of tilt control buttons (103a & 103b). Other camera controls and actions described below enable vehicle operator to achieve higher vision performance than capable from natural eyesight within the confines of said vehicle. Another configuration of the invention is connecting said video signal cable (24) to a video recorder (212) that is housed in a steel security box (210) from either said display-control (21) or said image capture box (200) where said steel security box can be padlocked at a security tang (211). Said security box (210) and said video recorder (212) enable said mobile pan and tilt camera (20) images to be archived. Still another configuration of the invention is connecting said video signal cable (24) to a laptop computer (220) through a PCMCIA Frame Grabber card (221) from either said display-control (21) or said image capture box (200) where said PCMCIA Frame Grabber card (221) digitizes video images from said mobile pan and tilt camera (20) and said laptop computer (220) can store the images internally, and/or display images, and/or transmit images by means of a PCMCIA modem card (222). The transmission of images from either said laptop computer (220) or said image capture box (200) can be accomplished on a network or by wireless means. Practical application of this invention by mobile patrol guards would be the configuration of said mobile pan and tilt camera (20) connected to said display-control (21) via said signal cable (29) for image presentation on said flat panel monitor (100) and video images are routed to said image capture box (200) via said video signal cable (24) where some or all images selected by the operator are sent from said image capture box (200) by wireless means from an antenna (201) mounted on the patrol guard vehicle to an image vault (234) for official and customer review. Said image capture box (200) is comprised of a computer, a video frame grabber, a storage media like RAM and hard drive, and an RF modem.

Figure 5:
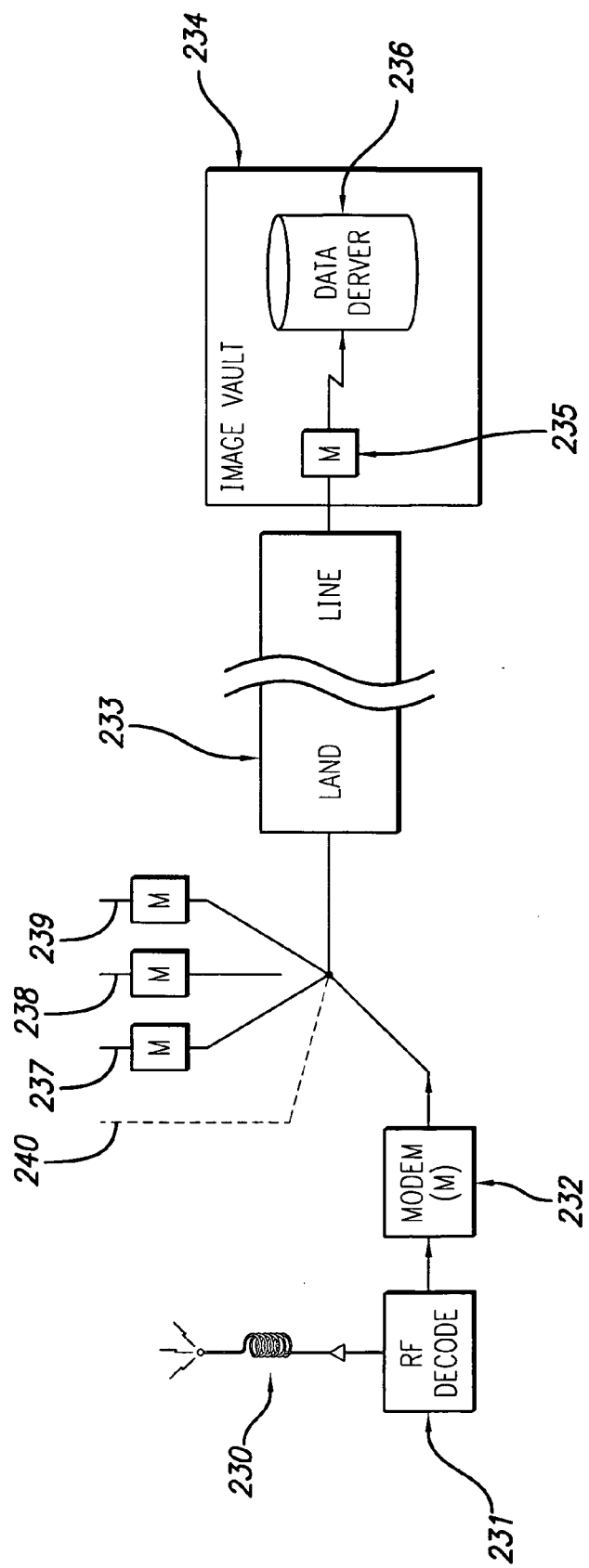
FIG. 5 is a functional block diagram of the image data server.

FIG. 5 is a functional block diagram of the practical implementation of distribution of images from said mobile pan and tilt camera (20). Video images (single frame picture, few picture frames, or full motion picture frames) are transmitted from said image capture box (200) and received by said image vault (234). Transmitted images are collected by wireless means at a receiving antenna (230) where the signal is filtered by a Radio Frequency Decoder (231), converted to a digital format and then transmitted by a modem (232) via land lines to said image vault (234). People that hire mobile patrol guards can now view images of their facilities by using a computer (237) attached to a like said modem (232) and connecting via a land line (233) and the internet to said image vault (234) where after validating inquiry credentials, customer facility images are transmitted from said image vault to said customer computer (237) and displayed. Additional, but not a complete list, of users of captured mobile images include a police officer (238) or a fire department official (239), or an internet world wide web subscriber (240) can access said image vault (234) via like said modems (232).

Figure 6:
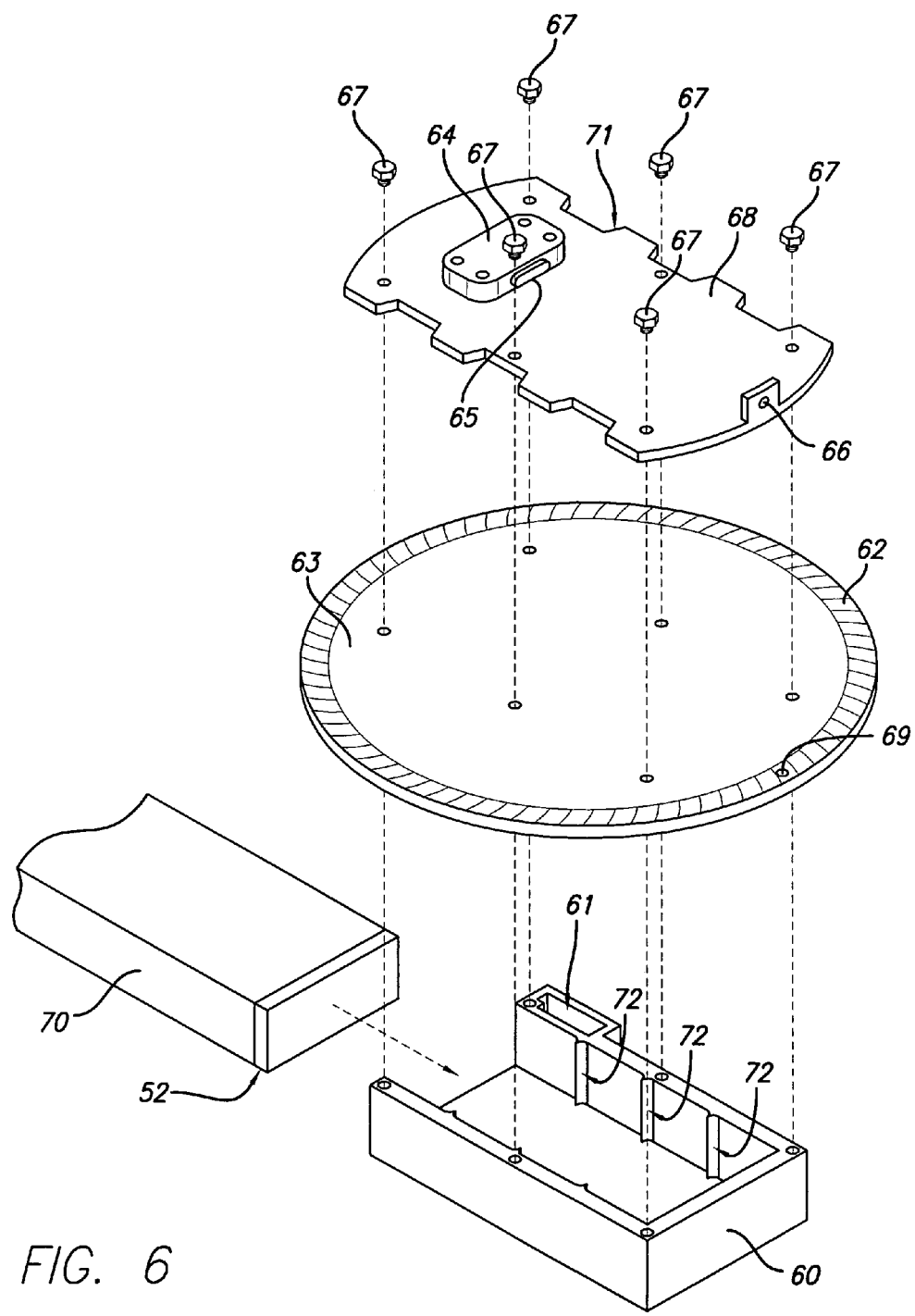
FIG. 6 is a partial exploded view of the THULE® brand roof rack mounting hardware that mates with said mobile pan and tilt camera.

FIG. 6 shows said mounting assembly (22) with the specific embodiment drawn to fit a THULE® brand roof rack bar (52). Said THULE® roof rack bar (52) has a rubber coating (70) on the outside surface. Said mounting assembly (22) is comprised of a lower clamp (60) that closely conforms to form and size of said THULE® roof rack bar (52). Said lower clamp (60) incorporates ridges (72) that seat in said rubber coating (70) when a mounting plate (68) along with a weather seal plate (63) are secured with six screws (67) and provide a secure and tight adherence to said THULE® roof rack bar (52). On each side of said mounting plate (68) are slotted openings (71) that match said slotted openings (38) in said camera base (34). Said connector housing (64) incorporates an electrical female signal connector (65) that mates to said mobile pan and tilt camera (20) at said electrical male signal connector (40). At the end of said mounting plate (68) resides a threaded flange (66) that provides the means for securing said mobile pan and tilt camera (20) to said mounting assembly (22) from screwing said security screw (35) into said threaded flange. In said weather seal plate (63) is a locking hole (69) that accepts the end of said ball-pin plunger (36) from said mobile pan and tilt camera (20) as the safety mechanical locking mechanism to said mounting assembly (22). Said weather seal plate (63) utilizes a foam strip (62) at the outside edge to repel moisture and dirt when said mobile pan and tilt camera (20) is installed on said mounting assembly (22).

Figure 7:
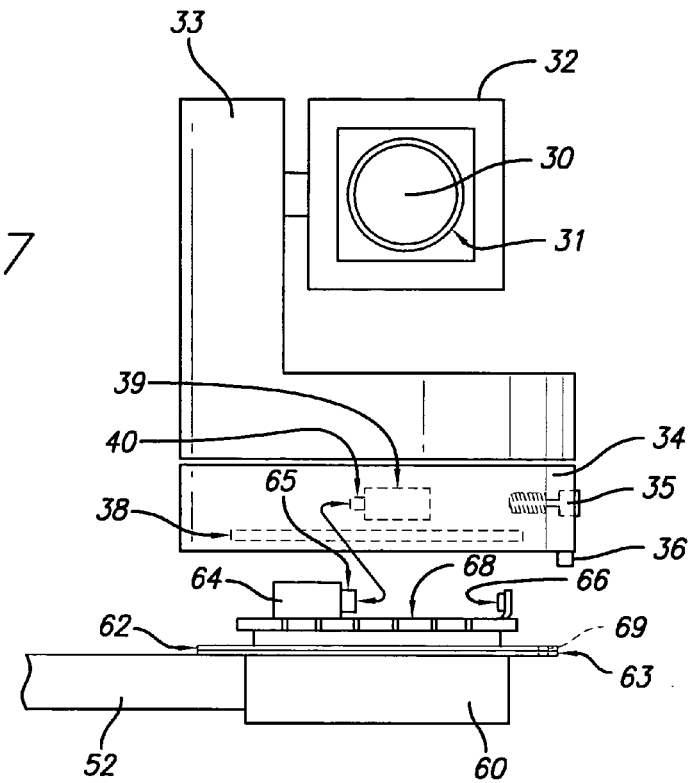
FIG. 7 is a side view cutaway of the mechanical and electrical connect/disconnect mechanisms.

FIG. 7 shows the installation action required to place said mobile pan and tilt camera (20) on said mounting assembly (22). Said mobile pan and tilt camera (20) is brought to said mounting assembly (22) and is offset by the pitch of said slotted teeth (38) such that they miss said slotted teeth (71) and said mounting plate (68) moves into cavity in said mobile pan and tilt camera (20). Said mobile pan and tilt camera (20) is then moved relative to said mounting assembly (22) to remove offset of said slotted teeth (38 & 71). This last sliding action engages said electrical male signal connector (40) with said electrical female signal connector (65) and said ball-pin plunger (36) drops into said locking hole (69). From operator action, said security fastener (35) engages said threaded flange (66) to provide secondary mechanical engagement of said mobile pan and tilt camera (20) and said mounting assembly as well as security from vandals. Said mobile pan and tilt camera (20) is now ready for operation.

Figure 8:
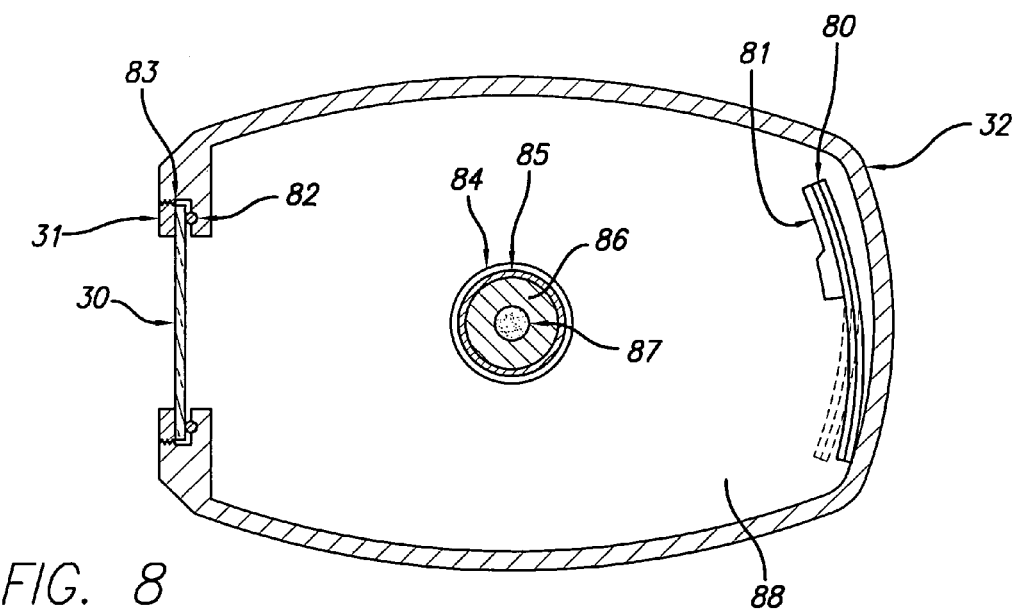
FIG. 8 is a cross section of said mobile pan and tilt camera's camera housing showing thermal and moisture control systems.

Inside said camera housing (32) is a camera cavity (88) where the temperature and humidity should be controlled to gain the best performance from a camera (150) and the optics. FIG. 8 is a cross-section drawing noted as A-A in FIG. 3d. A temperature control system is comprised of a voltage regulator (81), a bi-metal heatsink (80), and said camera housing (32). Said voltage regulator (81) provides stable electrical power to said camera (150) and from this, generates heat as a byproduct. Said bimetal heatsink (80) provides a thermal path for heat from regulator to pass to the airspace of said camera cavity (88). From cold conditions in said camera cavity (88), said bimetal heatsink (80) is a distance from said camera housing (32). As said voltage regulator (81) and said camera cavity (88) rise in temperature, said bimetal heatsink (80) will begin to flex. The temperature set-point for said camera cavity (88) is determined by the size, weight, and type of metals combined to make said bimetal heatsink (80) where, at the optimal temperature set-point for said camera (150) and optics operation, said bimetal heatsink (80) flex's to engage said camera housing (32). Said camera housing (32) is aluminum or other thermally conductive material will provide a much greater capacity for conducting heat from said voltage regulator (81) and said camera cavity (88). When the temperature in said camera cavity (88) and voltage regulator (81) begin to cool, said bimetal heatsink (80) relaxes and loses direct contact with said camera housing (32) enabling said bimetal heatsink (80) to increase in temperature and add heat to said camera cavity (88). Said camera cavity (88) is a water tight environment. Said commercially available optic element (30) is seated on a bezel o-ring (82) and said camera housing (32) is also seated on a o-ring fastened to a camera housing support (89). Said camera housing support (89) is mounted to a tilt shaft (84) that will allow said camera's (150) field of view translate vertically. Through said tilt shaft (84) pass signal wires to said camera (150) from said electrical male signal connector (40). A moisture control system for said camera cavity (88) is made up of a GORETEX® microporous membrane signal wire plug (85). Said GORETEX® signal wire plug (85) has an open center (87) to accept signal wires during fabrication of said mobile pan and tilt camera (20), a middle circular section made from GORETEX® microporous membrane material designed to block water and pass vapor, and an outer ring for structure and support in mounting to said tilt shaft (84). One of the final steps in assembling said mobile pan and tilt camera (20) is to seal said open center (87) with silicon gel or like substance to provide moisture barrier at said open center (87). When said camera cavity (88) heats up from operation and becomes hotter than the outside ambient temperature, any water vapor in said camera cavity (88) will pass out and through said GORETEX® microporous membrane signal wire plug (85) leaving said camera cavity (88) with less water vapor. When said mobile pan and tilt camera (20) is shut off and said camera cavity (88) cools relative to ambient temperature, a reverse flow into said camera cavity (88) can occur, but water will be blocked at said GORETEX® microporous membrane signal wire plug (85) and the relatively quick cool down period will allow only a minimum of water vapor to return to said camera cavity (88). This moisture control system effectively 'pumps down' the water vapor in said camera cavity (88) each time the power is cycled for operation.

Figure 9A:
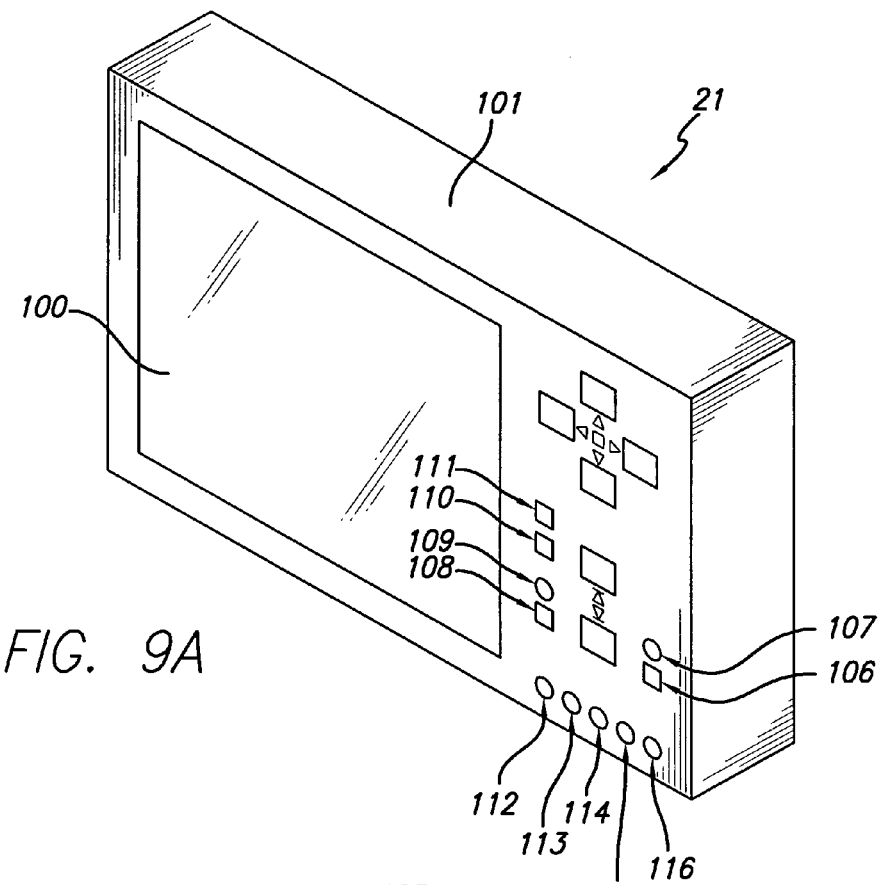
FIG. 9 is a multiple view drawing of a mobile display and control system.
Figure 9B:
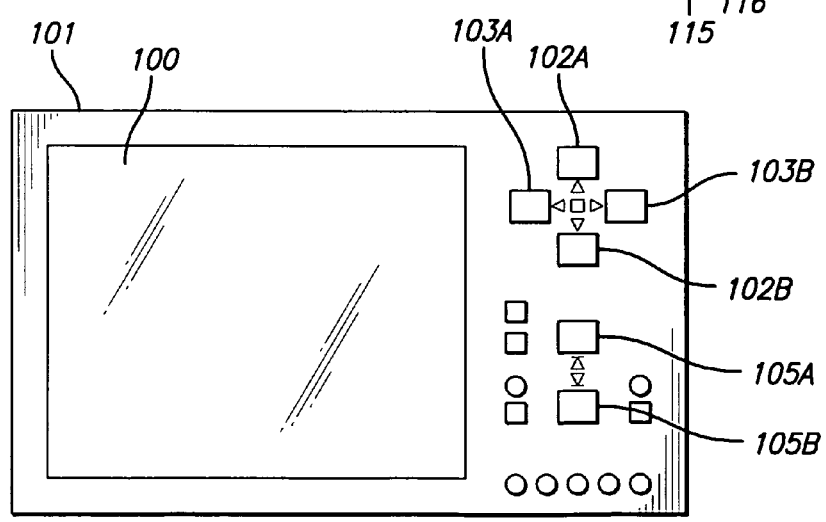
Figure 9C:
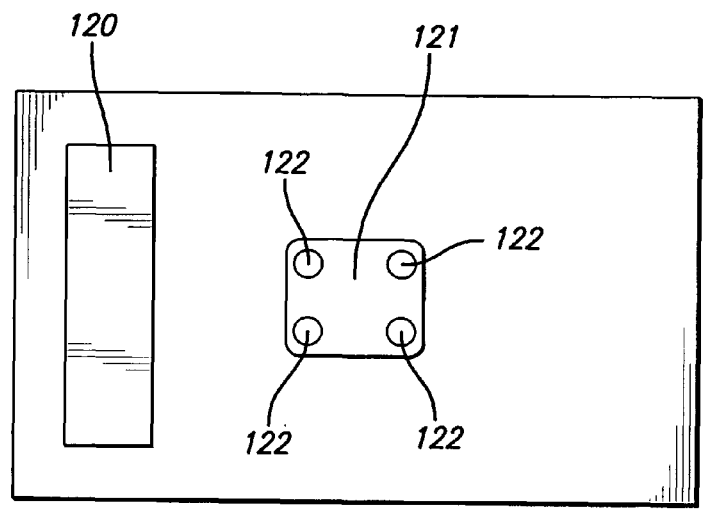
Figure 9D:
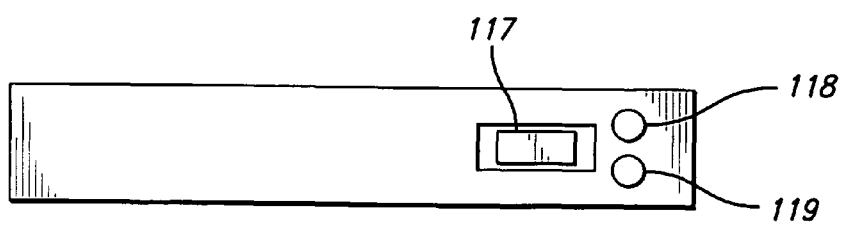

Images from said mobile pan and tilt camera (20) are presented to the vehicle operator at said display-control (21) from said flat panel monitor (100). Shown in FIGS. 9a through 9d are design features of said display-control (21). FIG. 9a shows a perspective view of said display-control (21) that would be positioned to the right of the steering wheel for US drivers and only the right hand is needed to control said camera (150) pointing, zoom, focus, and field of view stability, and said flat panel monitor (100) brightness. All above mentioned controls can be activated by the thumb while said display-control (21) is held by same thumb hand by the fingers in a finger grip cavity (120) and the palm against the right-outside edge of said display-control (21). Said display-control (21) is comprised of a power indication light emitting diode (104) that signifies that said display-control (21) has power, a tilt up button (102a), a tilt down button (102b), a pan right button (103a), a pan left button (103b), a zoom in button (105a), a zoom out button (105b), an autofocus on/off button (111), a manual focus near button (110), a manual focus far button (108), an autofocus on light emitting diode (109), a field of stability on/off button (106), a field of stability on/off light emitting diode (107), said flat panel monitor (100), a signal connector (117), a video signal connector (118), a power connector (119), a mounting support area (121), an adjustment access for pan control speed (112), an adjustment access for tilt control speed (113), an adjustment access for contrast (114) for said flat panel monitor (100), an adjustment access for color (115) for said flat panel monitor (100), an adjustment access for contrast (116) for said flat panel monitor (100), and a display-control housing (101). Pan and tilt pointing speed is determined by a method of touching said pan and tilt buttons (102a, 102b, 103a, 103b) with single touch and hold for low speed or by quickly touching said pan and tilt buttons (102a, 102b, 103a, 103b) twice and holding (like 'double clicking' a computer mouse) for high pointing movement.

Figure 10A:
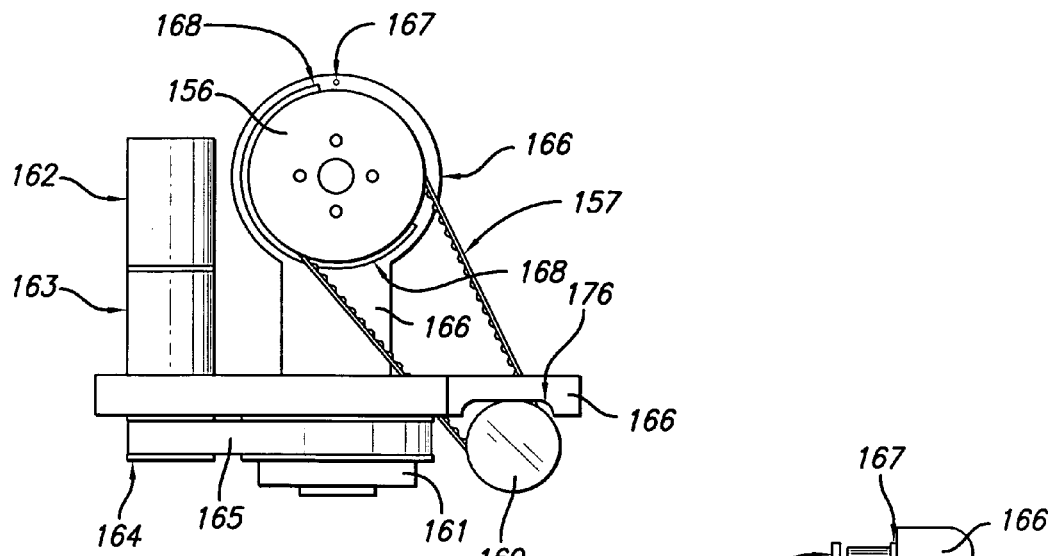
FIG. 10 is a multiple view drawing of pan and tilt invention.
Figure 10B:
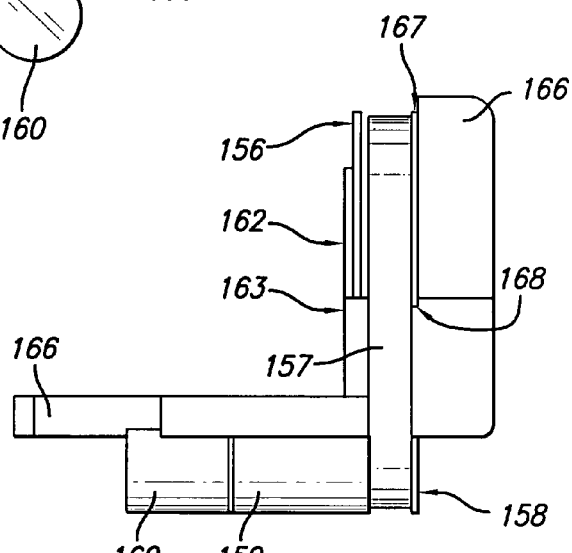
Figure 10C:
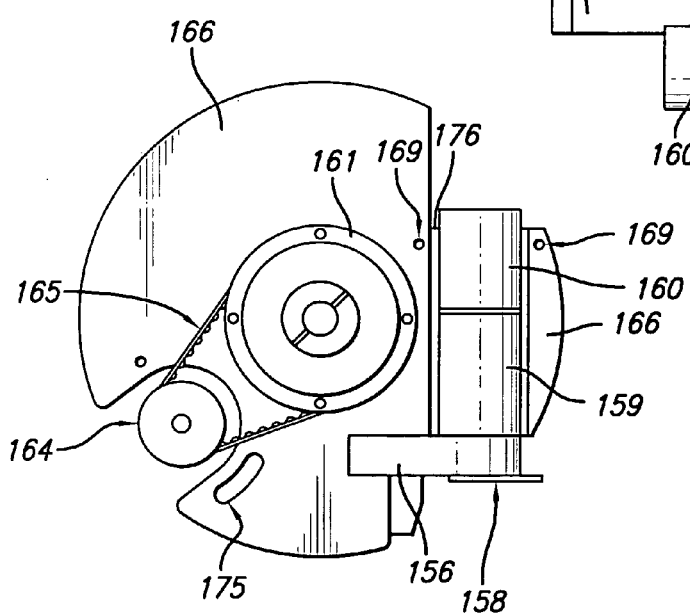

At the center of said mobile pan and tilt camera (20) invention is a pan & tilt mechanism (FIG. 10a-c) that is simple, few parts, rugged, and reliable. Said pan and tilt mechanism (FIG. 10a-c) is comprised of a main support (166), a tilt assembly (156), a pan assembly (161), a pan drive gear (164), a pan drive belt (165), a pan motor (162), a pan gear reduction (163), a tilt drive gear (158), a tilt drive belt (157), a tilt motor (160), and a tilt gear reduction (159). Both the pan assembly (161) and the tilt assembly (156) are bolted to said main support (166) and therefore maintain small angular misalignment error from each other. Said pan motor (162) and said pan gear reduction (163) and said pan drive gear (164) are mated and fastened to said main support (166) with said pan drive belt (165). Said pan drive belt (165) is put under proper tension by moving said pan gear reduction (163) about a pan adjustment hole (175). Said tilt motor (160) and said tilt gear reduction (159) and said tilt gear (158) are mated and fastened to said main support (166) with said tilt drive belt (157). Said tilt drive belt (157) is put under proper tension by moving said tilt gear reduction (159) in a tilt support slot (176). Said pan assembly (161) becomes integral to said mobile pan and tilt camera (20) by bolting to said camera base (34) from bottom. Signal wires from said electrical male signal connector (40) pass through center of said pan assembly (161) for motor control and pass through center of said tilt assembly (156) for said camera (150) operation.

Figure 11:
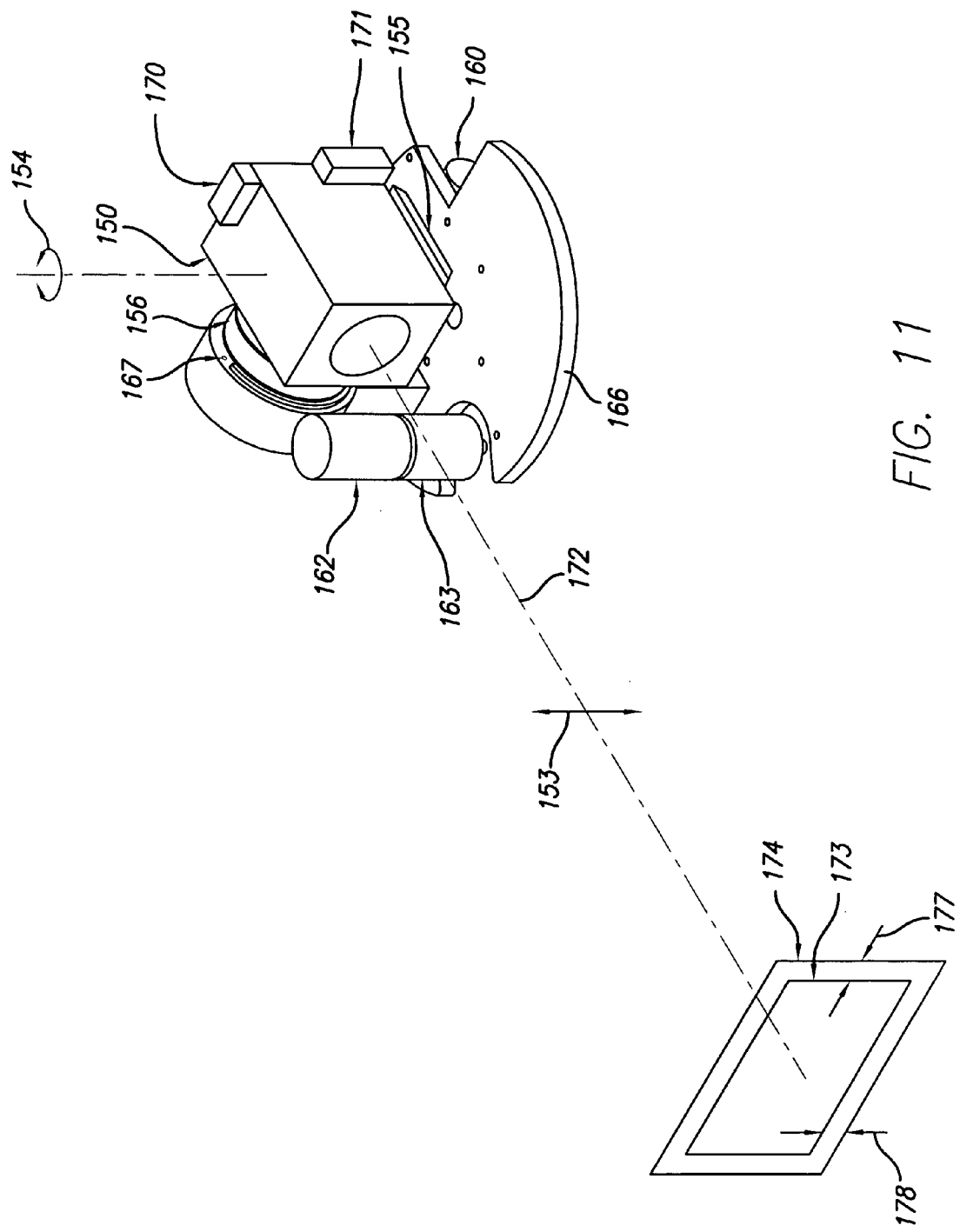
FIG. 11 is a functional diagram of pan and tilt mechanism, camera, field of view and field of regard diagram, and electronic backlash-free system.

Said pan & tilt mechanism (FIG. 10a-c) does not have any additional parts to compensate for pointing errors and vibration due to backlash that is present in said pan drive gear (164), said tilt drive gear (158), said pan drive belt (165), said tilt drive belt (157), said pan gear reduction (162), said tilt gear reduction (159), said pan assembly (161), or said tilt assembly (156). FIG. 11 demonstrates an inertial-electronic compensation for traditional gear backlash problems. Said camera (150) SONY®—Model EVI330T) is comprised of a vertical sensing accelerometer (171) and a lateral sensing accelerometer (170). Said camera (150) is bolted to a camera cantilever support (155). Said camera cantilever support (155) is bolted to tilt assembly (156). Inside said camera (150) are image processing electronics that produce a video field of view (173) that is smaller than said camera's (150) total image sensor size which is a sensor field of regard (174).

Under normal conditions, said video field of view (173) is centered in said sensor field of regard (174). Said video field of view (173) is the picture that is displayed on said display flat panel (100). Once vibration or wind forces are introduced to said mobile pan and tilt camera (20), pointing errors can occur from gear backlash movements. Said camera (150) measures said accelerometers (170 & 171) and computes real-time spatial shifts in image sensor pointing and compensates by electronically shifting said video field of view (175) to a different part of said image field of regard (174) that exactly offsets physical displacement due to vibration, wind forces, and gear backlash movements.

Figure 12:
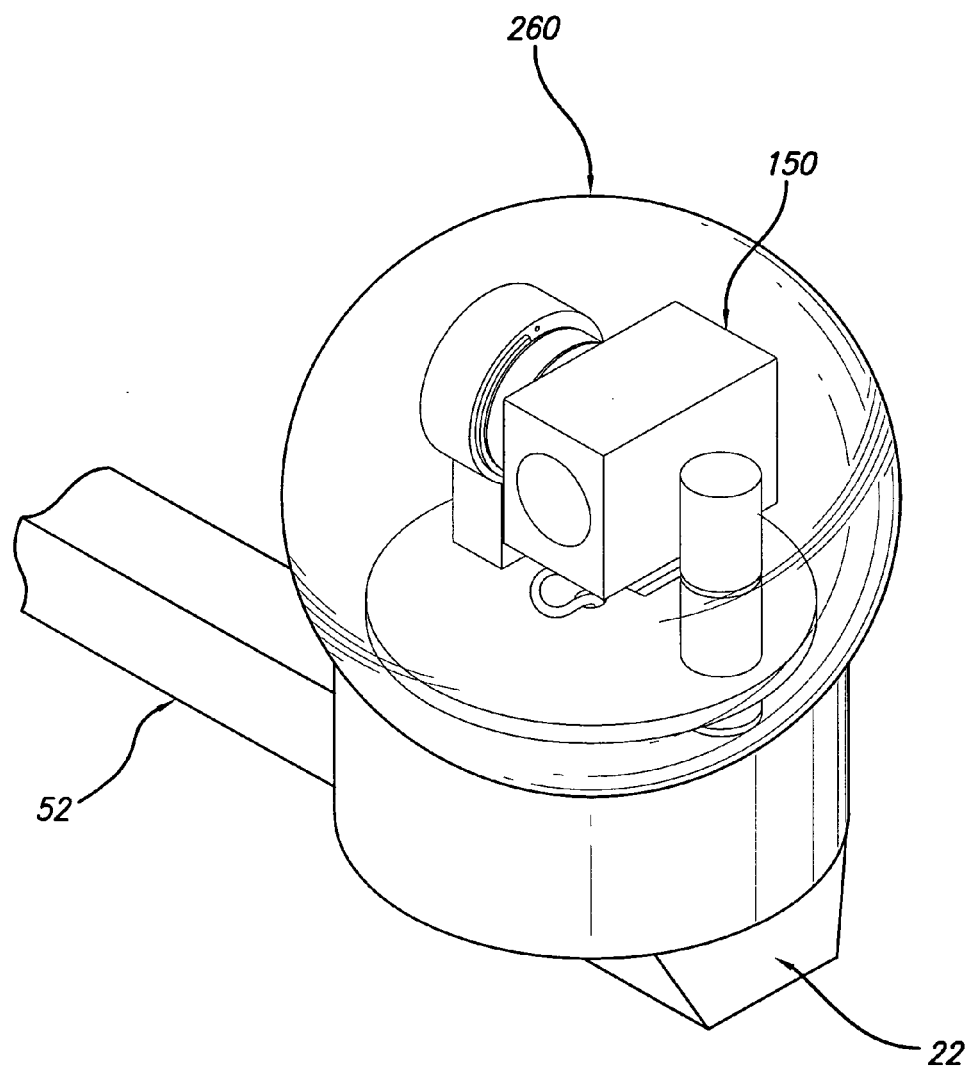
FIG. 12 is an alternate embodiment of said mobile pan and tilt camera mounted to said rack.

FIG. 12 shows another embodiment of said mobile pan and tilt camera (20) where said camera housing (32) and the top part of said pan housing (33) are replaced with a translucent dome (260) that can act as a wind screen and when tinted, can provide hidden pointing angles of said camera (150). Said mounting assembly (22) has an improved outside form that is aerodynamic for least noise and wind resistance.

Figure 13:
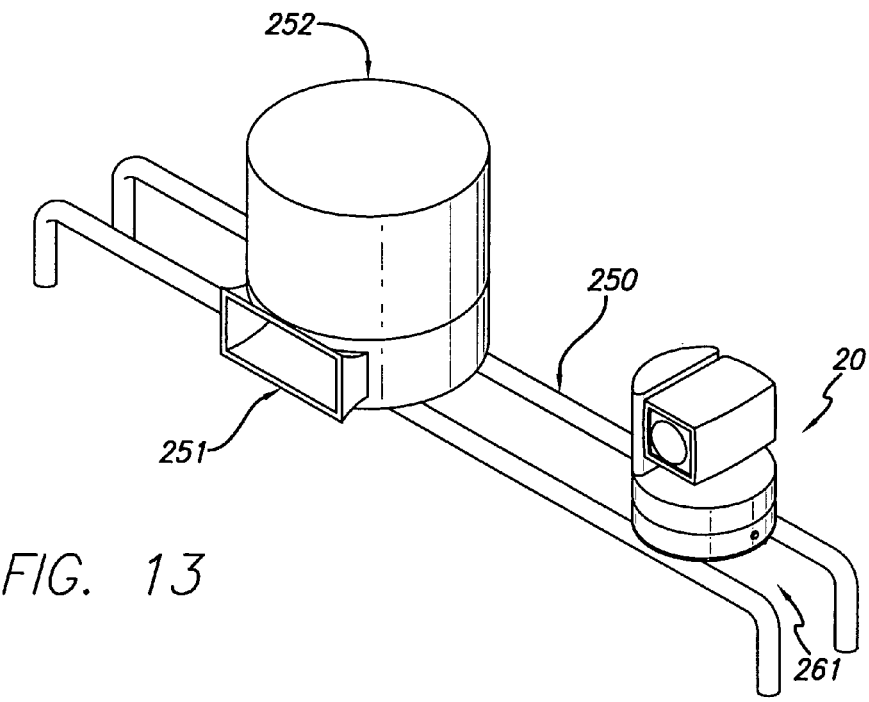
FIG. 13 is a perspective view of said mobile pan and tilt camera mounted to a typical light bar assembly used on patrol security vehicles and emergency vehicles.

FIG. 13 shows another mounting application for emergency vehicles. Said mobile pan and tilt camera (20) is attached to a typical vehicle light rack (250) that traditionally is comprised of an emergency light(s) (252) and a siren (251). Said mounting assembly (22) is adapted to incorporate said lower clamp (60) with form and fit to match said typical vehicle light rack (250).

Figure 14:
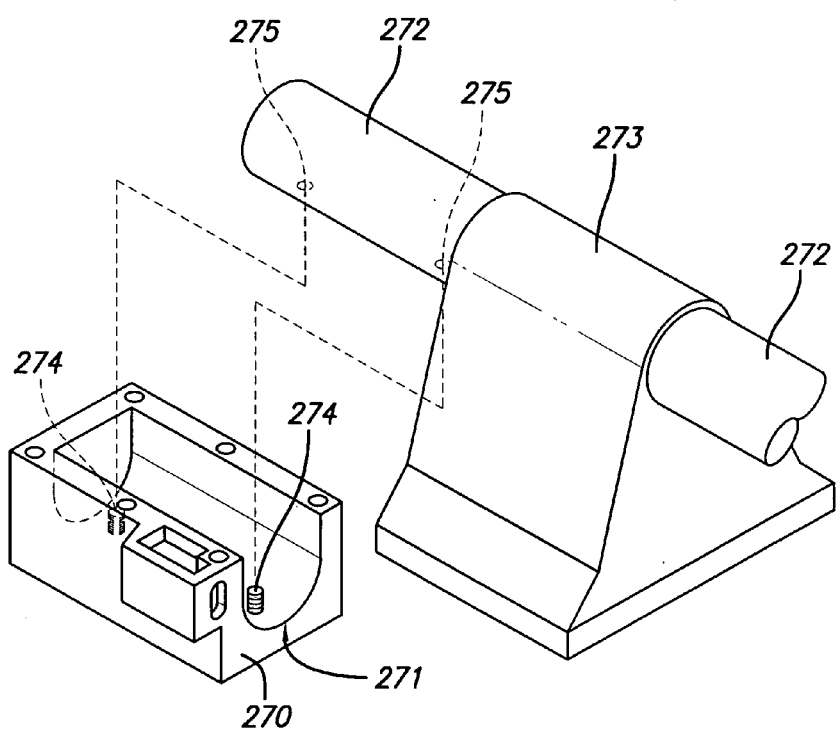
FIG. 14 is an alternative mounting assembly for a YAKIMA® brand roof rack system.

FIG. 14 shows another commercially available roof rack system for said mounting assembly (22) and this specific embodiment fastens to a YAKIMA® brand roof rack bar (272). Said YAKIMA® roof rack bar (272) has a rubber coating on the outside surface. Said mounting assembly (22) is comprised of a lower clamp (270) that closely conforms to form and size of said YAKIMA® roof rack bar (272). Said lower clamp (270) incorporates a registration pin (274) that seats in mating holes in said YAKIMA® roof rack bar (272) when a mounting plate (68) along with a weather seal plate (63) are secured with six screws (67) and provide a secure and tight adherence to said YAKIMA® roof rack bar (272). Said registration pin (274) engages said YAKIMA® roof rack bar (272) and keeps said mobile pan and tilt camera (20) secure and without rotation to said YAKIMA® roof rack bar (272).

Figure 15:
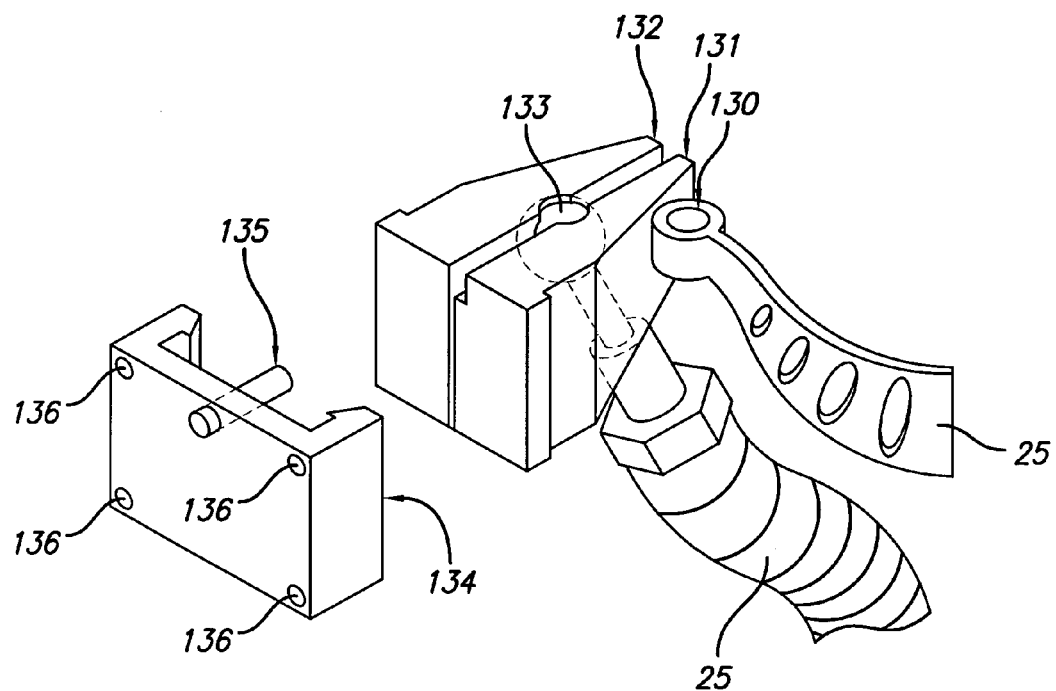
FIG. 15 is a perspective view of a six degree of freedom adjustment mechanism for said mobile display and control system.
Figure 16:
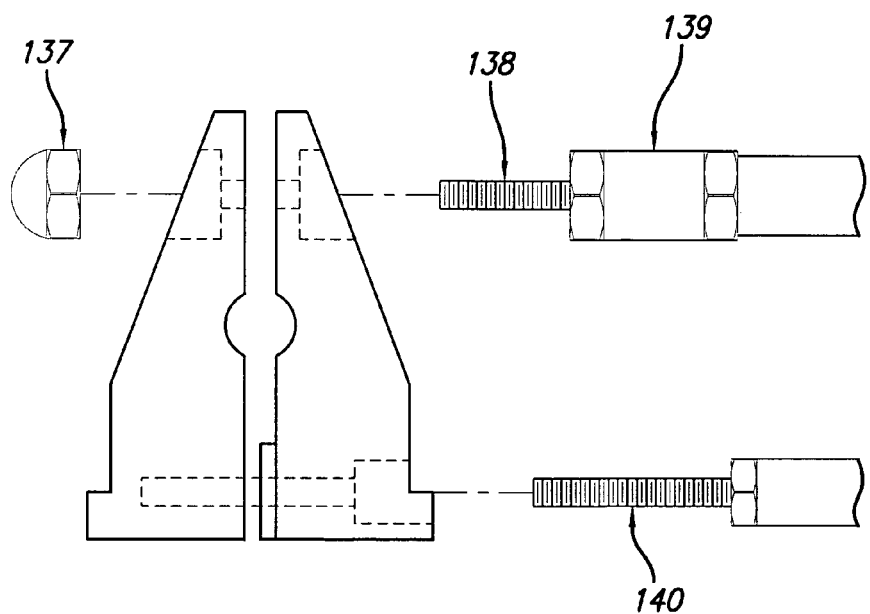
FIG. 16 is a top view drawing of the clamp used in said six degree of freedom adjustment mechanism.

FIGS. 15 and 16 demonstrate the means by which said adjustable yoke (26) provide single hand adjustment of said display-control (21). A mounting bracket (134) is fastened to the back of said display-control (21) at said mounting support area (121). At the top of said mounting bracket (134) is a display stop pin (135). Said adjustable yoke (26) is comprised of said yoke lever (25), a pair of locking jaws (131 and 132), an end ball (133), a limit travel screw (140), a yoke lever support bolt (138), and a yoke support nut (137). Said end ball (133) provides the means for flexible positioning of said locking jaws (131 and 132) relative to said gooseneck (27). Said yoke lever (25) is fastened to said locking jaws (131 and 132) by said yoke lever support bolt (138) and said yoke lever support nut (137). Said yoke lever (25) provides a non-concentric seating (130) for said yoke lever support bolt (138). Said non-concentric seating (130) provides a cam action where said locking jaws (131 and 132) come together from movement of said yoke lever (25). Said locking jaws (131 and 132) have a spherical cavity where said end ball (133) seats with loose tolerance. The face of said locking jaws (131 and 132) fit inside said display mounting bracket (134) by sliding face of said locking jaws (131 and 132) into the bottom of said display mounting bracket (134) until seated against said display stop pin (135) and then moving said yoke lever (25) such that faces of said locking jaws (131 and 132) separate inside said display mounting bracket (134) and hold tight said display-control (21) to said gooseneck (27).

Figure 17A:
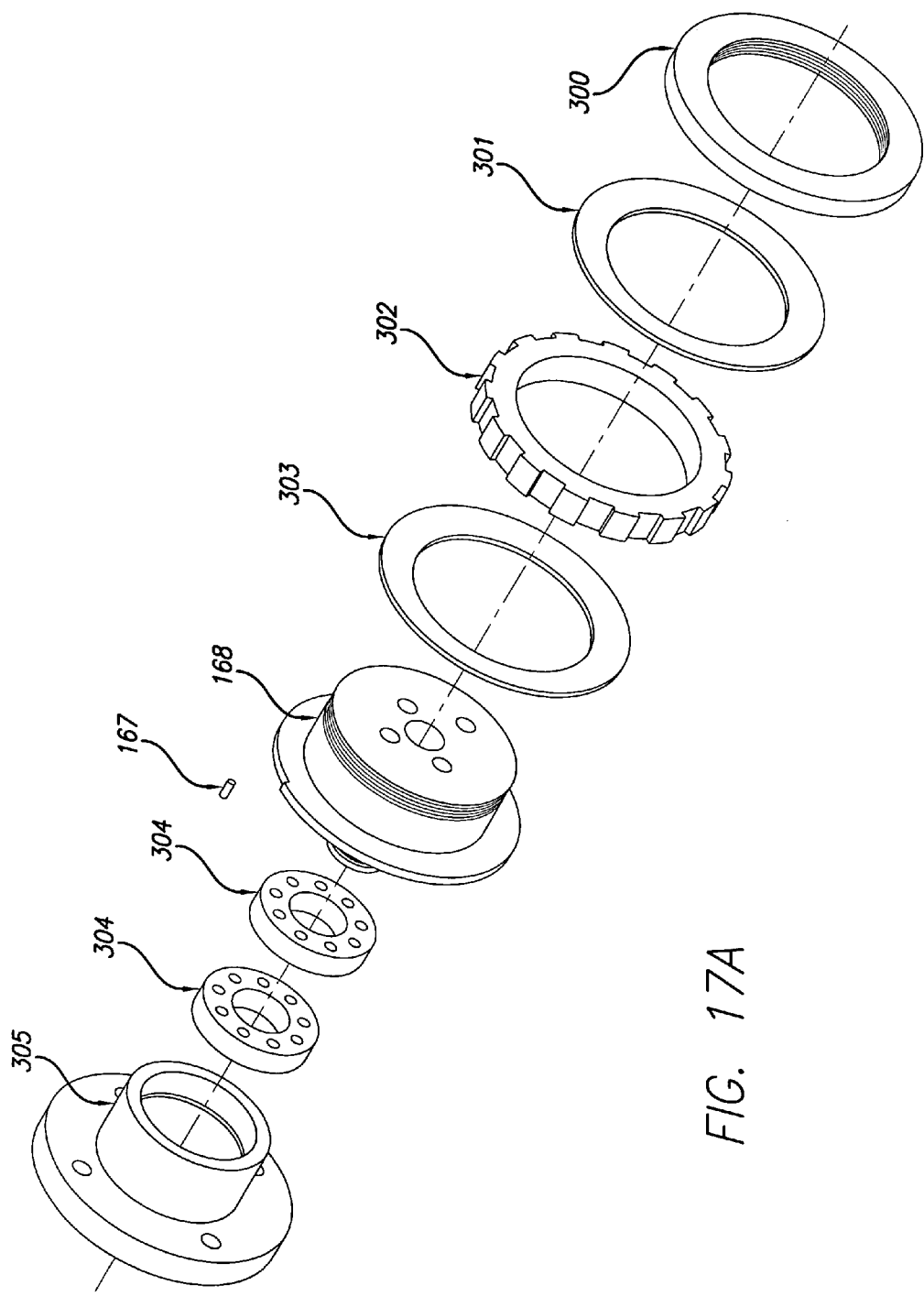
FIG. 17 is an exploded view of the tilt assembly along with a cross-sectional view of the component interaction.
Figure 17B:
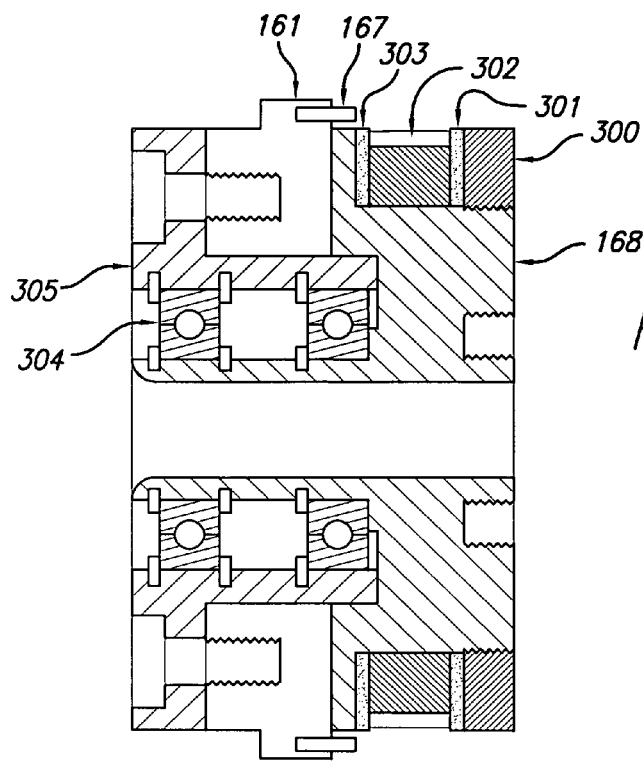

Said tilt assembly (156) is shown in an exploded view in FIG. 17. Said tilt assembly (156) is a single side suspension and gimbal for said cantilever camera support (155), drive mechanism for tilting said camera (150), and functions as a slip clutch when a tilt body (168) is mechanically stopped by a tilt stop pin (167). Said tilt assembly (156) is comprised of a tilt slip adjustment ring (300), a tilt wave washer (301), a tilt gear (302), a tilt friction pad (303), a tilt body (168), a tilt bearing set (304), and a tilt support (305). Said tilt support is bolted to said main support (166). Said tilt bearing (304) is placed on said tilt body (168) and held in place by a C-Clip (306). Another said C-Clip (306) is placed inside said tilt support (305) and said tilt body (168) is slid into said tilt support (305). Another set of said C-Clips (306) are placed inside said tilt support (305) and on said tilt body (168). The other said tilt bearing (304) is now placed inside said tilt support (305) and held in place by final set of said C-Clips (306) at said tilt support (305) and said tilt body (168). A tilt friction pad (303) is placed over said tilt body (168) followed by said tilt gear (302) followed by said tilt wave washer (301) and held by said tilt slip adjustment ring (300). Said tilt gear (302) is driven by said tilt belt drive (157) which in turn rotates said tilt body (168). Said tilt gear (302) is forced against said tilt friction pad (303) by said tilt wave washer (301). Amplitude of force is determined by the number of turns applied to said tilt adjustment ring (300). At the point said tilt body (168) comes in contact with said tilt stop pin (167), said tilt body (168) stops rotating. Said tilt gear (302) continues to rotate from said tilt motor (160) by overcoming friction between said tilt friction pad (303), said tilt body (168), and said tilt gear (302) and thereby keeping said tilt motor (160) from overheating or failing.

Figure 18B:
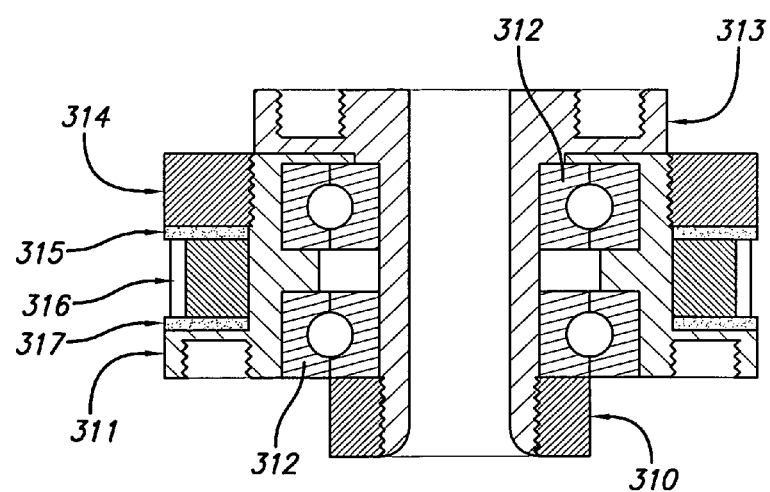
FIG. 18 is an exploded view of the pan assembly along with a cross-sectional view of the component interaction.
Figure 18A:
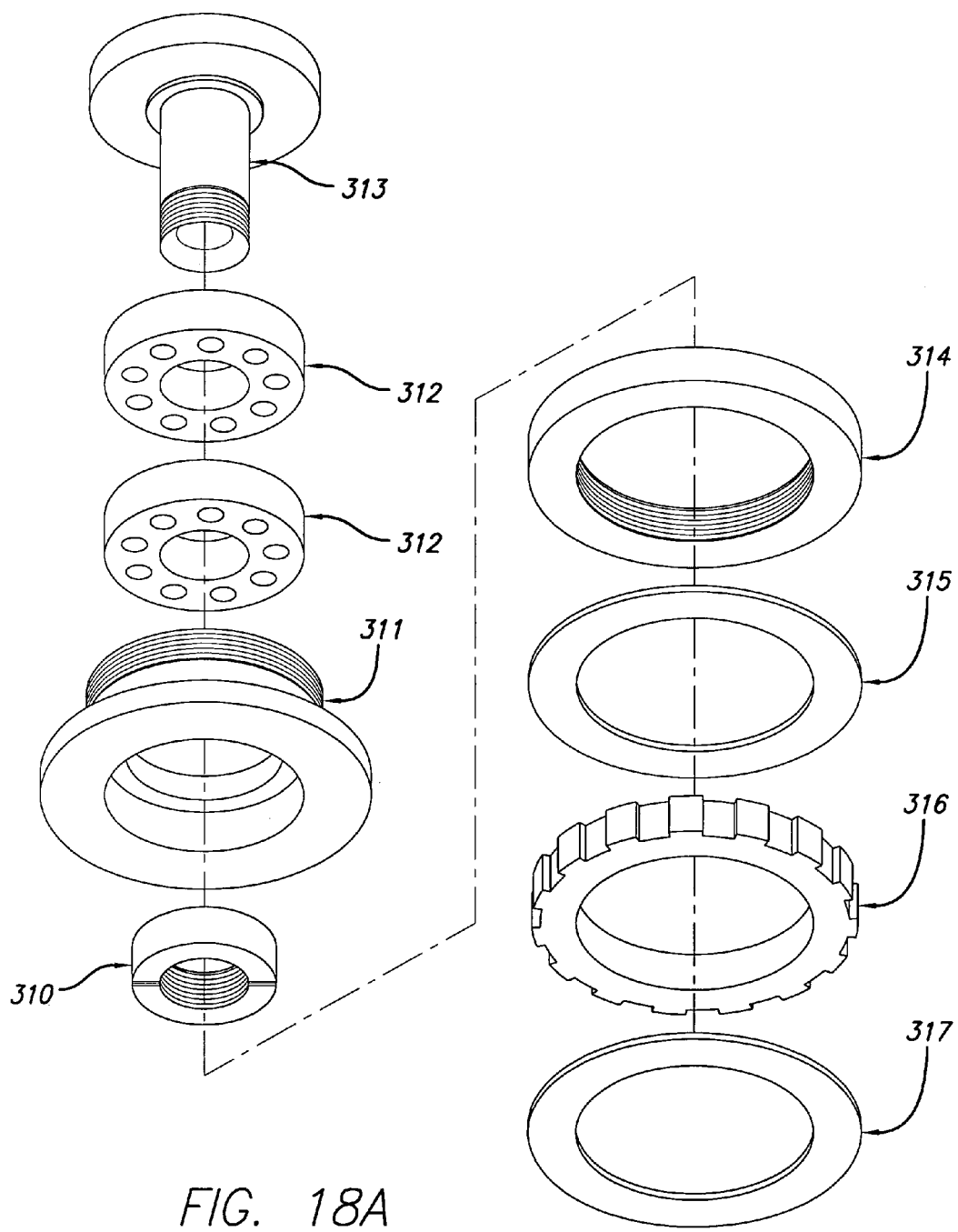

Said pan assembly (161) is shown in an exploded view in FIG. 18. Said pan assembly (161) is a single side suspension and gimbal for said main support (166), drive mechanism for panning said camera (150), and functions as a slip clutch when said main support (166) is mechanically stopped by a pan stop pin in said camera base (34). Said pan assembly (161) is comprised of a pan support (313), a pair of pan bearings (312), a pan body (311), a pan securing nut (310), a pan adjustment ring (314), a pan wave washer (315), a pan gear (316), and a pan friction pad (317). Said pan support (313) is bolted to said main support (166). The first said pan bearing (312) is placed inside pan support (313). Said pan friction pad (317) is placed on said pan body (311) along with said pan gear (316) and said pan wave washer (315) and secured with said pan adjustment ring (314) screwed on said pan body (311) with enough force from said pan wave washer (315) pushing said pan gear (316) against said pan friction pad (317) and said pan body (311). Said pan body (311) is placed inside said pan support (313). Second said pan bearing (312) is placed inside said pan body (311). Said pan body (311) is secured to said pan support by said pan securing nut (310). Said pan gear (316) is driven by said pan belt drive (165) which in turn rotates said pan body (311). Said pan gear (316) is forced against said tilt friction pad (317) by said pan wave washer (315). Amplitude of force is determined by the number of turns applied to said pan adjustment ring (314). At the point said main support (166) comes in contact with a pan stop pin on said camera base (34), said pan support (313) stops rotating. Said pan gear (316) continues to rotate from said pan motor (162) by overcoming friction between said pan friction pad (317), said pan body (311), and said pan gear (316) and thereby keeping said pan motor (162) from overheating or failing.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. A mobile pan and tilt camera and display-control apparatus comprising:
   a fully rotatable camera attached to a mount assembly that is mounted to a vehicle for capturing mobile images wherein said mount assembly incorporates a quick disconnect mechanism and a double locking mechanism where one mechanism is a security fastener;
   a display-control box having an image display screen and control buttons for controlling said camera and its movement, said display-control box being attached to an adjustable mount in said vehicle within an operator's view and reach;
   an image capture box for receiving said captured mobile images.

2. A mobile pan and tilt camera and display-control apparatus comprising:
   a fully rotatable camera attached to a mount assembly that is mounted to a vehicle for capturing mobile images, said mount assembly comprising a ball-plunger for self-locking said mount assembly;
   a display-control box having an image display screen and control buttons for controlling said camera and its movement, said display-control box being attached to an adjustable mount in said vehicle within an operator's view and reach;
   an image capture box for receiving said captured mobile images.

3. A mobile pan and tilt camera and display-control apparatus comprising:
   a fully rotatable camera attached to a mount assembly that is mounted to a vehicle for capturing mobile images comprising a security fastener as a secondary and operator activated mechanical locking mechanism for said mount assembly;
   a display-control box having an image display screen and control buttons for controlling said camera and its movement, said display-control box being attached to an adjustable mount in said vehicle within an operator's view and reach;
   an image capture box for receiving said captured mobile images.

4. A mobile pan and tilt camera and display-control apparatus comprising:
   a fully rotatable camera attached to a mount assembly that is mounted to a vehicle for capturing mobile images wherein full rotation is achieved by mounting said camera to a tilting mechanism mounted on a panning mechanism, said mobile pan and tilt camera and display-control apparatus further comprising a singular support for both said panning mechanism and said tilting mechanism and separate drive gears and slip clutches for both said panning mechanism and said tilting mechanism;
   a display-control box having an image display screen and control buttons for controlling said camera and its movement, said display-control box being attached to an adjustable mount in said vehicle within an operator's view and reach;
   an image capture box for receiving said captured mobile images.

5. A mobile pan and tilt camera and display-control apparatus as claimed in claim 4 wherein each slip clutch comprises:
   a rotationally free gear;
   a support housing for gear;
   a friction pad co-aligned to said gear between said gear and said support housing;
   a wave washer to apply a pressure against said rotationally free gear and said support housing of sufficient force to enable a motor to drive said gear and said support housing to a point where said support housing stops rotating and said rotationally free gear breaks friction of said friction pad while said motor continues to drive without overheating.

6. A mobile pan and tilt camera and display-control apparatus comprising:
   a fully rotatable camera attached to a mount assembly that is mounted to a vehicle for capturing mobile images;
   a display-control box having an image display screen and control buttons for controlling said camera and its movement, said display-control box being attached to an adjustable mount in said vehicle within an operator's view and reach;
   an image capture box for receiving said captured mobile images;
   a bimetal heat sink for camera power supply temperature control.

7. A mobile pan and tilt camera and display-control apparatus comprising:
   a fully rotatable camera attached to a mount assembly that is mounted to a vehicle for capturing mobile images;
   a display-control box having an image display screen and control buttons for controlling said camera and its movement, said display-control box being attached to an adjustable mount in said vehicle within an operator's view and reach;
   an image capture box for receiving said captured mobile images;
   a camera enclosure with bezel opening that is threaded to accept optical filters and is sealed with an o-ring for moisture blocking, said camera enclosure being adapted to act as an additional heat sink.

8. A mobile pan and tilt camera and display-control apparatus comprising:
   a fully rotatable camera attached to a mount assembly that is mounted to a vehicle for capturing mobile images;
   a display-control box having an image display screen and control buttons for controlling said camera and its movement, said display-control box being attached to an adjustable mount in said vehicle within an operator's view and reach;
   an image capture box for receiving said captured mobile images;
   a camera enclosure with bezel opening that is threaded to accept optical filters and is sealed with an o-ring for moisture blocking, said camera enclosure incorporating a one-way moisture passage plug with flexible and sealed passage for wires.

9. A mobile pan and tilt camera and display-control apparatus comprising:
   a fully rotatable camera attached to a mount assembly that is mounted to a vehicle for capturing mobile images wherein full rotation is achieved by mounting said camera to a tilting mechanism mounted on a panning mechanism, said mount assembly including an adapter plate to mate to a light bar used on emergency and patrol guard vehicles;
   a display-control box having an image display screen and control buttons for controlling said camera and its movement, said display-control box being attached to an adjustable mount in said vehicle within an operator's view and reach;
   an image capture box for receiving said captured mobile images.

* * * * *